United States Patent
Bunel et al.

(10) Patent No.: US 7,367,191 B2
(45) Date of Patent: May 6, 2008

(54) DEVICE FOR FIXING A BURNER RING IN AN AFTERBURNER COMBUSTION CHAMBER OF A TURBOJET ENGINE

(75) Inventors: Jacques Bunel, Fresnes (FR); Jacques Roche, St. Sulpice les Feuilles (FR)

(73) Assignee: SNECMA, Paris (FR)

( * ) Notice: Subject to any disclaimer, the term of this patent is extended or adjusted under 35 U.S.C. 154(b) by 428 days.

(21) Appl. No.: 11/110,725

(22) Filed: Apr. 21, 2005

(65) Prior Publication Data
US 2005/0247063 A1 Nov. 10, 2005

(30) Foreign Application Priority Data
May 5, 2004 (FR) ................................. 04 04798

(51) Int. Cl.
*F02K 3/10* (2006.01)
(52) U.S. Cl. ......................................................... 60/762
(58) Field of Classification Search .................. 60/761, 60/762, 765, 749
See application file for complete search history.

(56) References Cited

U.S. PATENT DOCUMENTS

| | | | |
|---|---|---|---|
| 3,236,048 A * | 2/1966 | Spears Jr. ..................... 60/761 |
| 4,724,671 A * | 2/1988 | Lapergue et al. .............. 60/763 |
| 4,901,527 A * | 2/1990 | Nash et al. .................... 60/765 |
| 5,224,825 A | 7/1993 | Strang et al. |
| 5,323,600 A | 6/1994 | Munshi |
| 5,335,490 A * | 8/1994 | Johnson et al. ................ 60/764 |
| 5,622,472 A | 4/1997 | Glowacki |

FOREIGN PATENT DOCUMENTS

EP    0 778 408 A2    6/1997

* cited by examiner

*Primary Examiner*—Ted Kim
(74) *Attorney, Agent, or Firm*—Oblon, Spivak, McClelland, Maier & Neustadt, P.C.

(57) ABSTRACT

Device for fixing a burner ring onto flameholder arms (14) in an afterburner combustion chamber of a turbojet engine, the burner ring being formed of ring sectors (12) placed more or less end to end and the ends of which are housed and guided between two circumferentially-directed parallel plates (34, 36) of the flameholder arms (14) and are immobilized between these plates (34, 36) by locking pieces (52) which are themselves held between the plates (34, 36) by immobilizing means (54, 56) engaged in aligned orifices (58, 60, 64) in the plates (34, 36) and in the locking pieces (52).

14 Claims, 4 Drawing Sheets

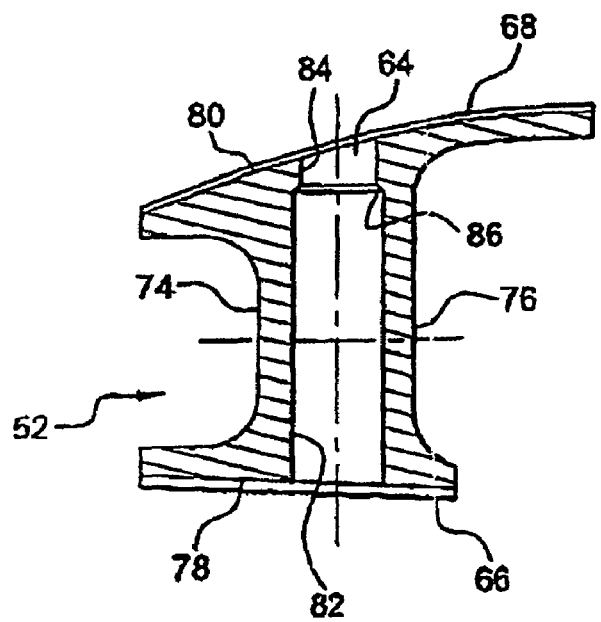
Fig. 4
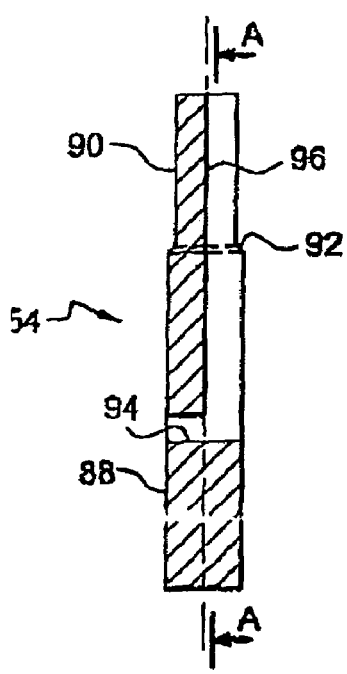
Fig. 5
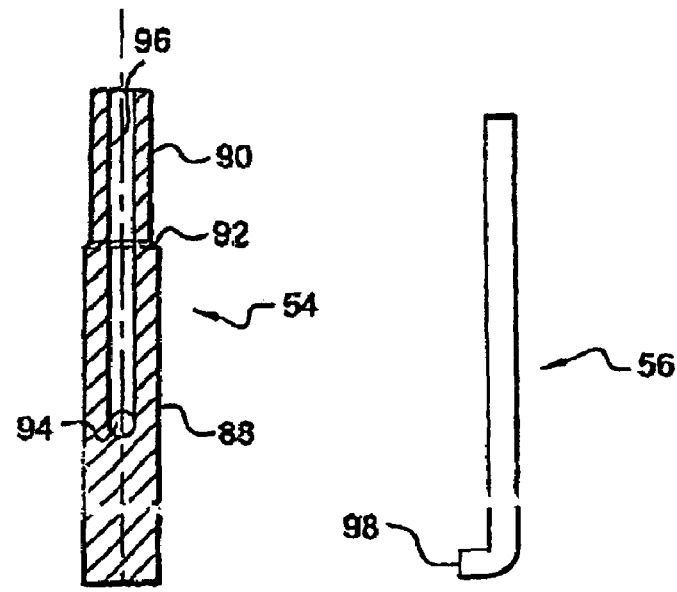
Fig. 6 Fig. 7

DEVICE FOR FIXING A BURNER RING IN AN AFTERBURNER COMBUSTION CHAMBER OF A TURBOJET ENGINE

The present invention relates to a device for fixing a burner ring onto flameholder arms in an afterburner combustion chamber of a bypass turbojet engine.

In the conventional way, the burner ring of an afterburner combustion chamber is mounted near a radially outer end of the flameholder arms which extend into the main stream leaving the combustion chamber of the turbojet engine.

In operation, the temperature in the turbojet engine afterburner combustion chamber is approximately 1100° K in the absence of afterburning and reaches about 2000° K in afterburning mode.

The burner ring is therefore subjected to very high temperatures and to significant radiation which gives rise to significant thermal expansion of its components.

It is known practice for the burner ring to be formed using ring sectors placed end to end, leaving a space between the facing ends of these sectors so as to allow them to expand freely when the turbojet engine is running.

The burner ring sectors cannot be fixed to the flameholder arms in a simple way using bolts because of the significant thermal expansion experienced by the parts. In addition, it is necessary for the fixing means used to be usable in a confined space, to which access is restricted, and preferably without using special tooling which would be difficult to manipulate inside the afterburner combustion chamber. In addition, these fixing means need to be thermally protected.

It is a particular object of the invention to afford a solution to these problems that is simple, economical and effective.

To this end, the invention proposes a device for fixing a burner ring onto flameholder arms in a turbojet engine afterburner combustion chamber, the burner ring being formed of ring sectors placed more or less end to end, characterized in that the facing ends of the consecutive ring sectors are housed and guided between two circumferentially-directed roughly parallel plates of the flameholder arms and are immobilized between these plates by locking pieces engaged between said plates and between the facing ends of the ring sectors, said locking pieces being themselves held between said plates by immobilizing means engaged in aligned orifices in said plates and in said locking pieces.

The device according to the invention does not use screws and bolts and allows the ring sectors three-dimensional expansion. Furthermore, the device according to the invention is simple and easy to fit and to remove, neither of which operations requires special tooling.

Advantageously, each locking piece is made in one piece and of rounded overall shape in order not to exhibit spikes or projections which would act as flameholders in the afterburning mode.

Each locking piece comprises two opposed faces, a radially inner face and a radially outer face respectively, which are engaged between flanges of the ring sectors and which are of a shape and curvature that correspond to those of the flanges of the ring sectors.

The locking pieces thus match the interior shape of the burner ring sectors and effectively hold these sectors while at the same time allowing them to expand freely in afterburning mode.

According to another feature of the invention, each locking piece comprises a through passage directed radially respectively with respect to the axis of the afterburner combustion chamber and housing a cylindrical rod, the ends of which are engaged in the aforementioned orifices in the plates of the flameholder arm.

This rod immobilizes the locking piece and holds the locking piece and the ring sectors axially and in terms of rotation with respect to the flameholder arm.

The ends of the rod lie flush with the surfaces of said plates which are situated on the opposite side to the locking piece, so as not to form spikes or projections on which the flames could catch in afterburning mode.

In one preferred embodiment of the invention, the device comprises means for preventing translational movement of the rod in the through passage of the locking piece, these means comprising a shoulder formed on the cylindrical surface of the rod and resting against a shoulder on the internal surface of the passage in the locking piece.

These shoulders allow the rod to be positioned precisely in the through-passage of the locking piece, in an immobilizing position in which the ends of the rod lie just flush with the surfaces of the plates of the arms.

In an alternative form of embodiment of the invention, the shoulders of the rod and of the passage in the locking piece are off-centered or dissymmetric with respect to the axis of the rod and of the passage and thus form means for immobilizing the rod in terms of rotation in the passage.

In the preferred embodiment of the invention, the rod comprises a housing to accommodate a pin, a first end of which is immobilized in terms of rotation and in terms of translation in said housing and the second end of which extends into the aforementioned orifice in one of the plates of the flameholder arm and is held by means provided on this plate.

The pin completes the immobilization of the device according to the invention between the plates of the arm.

Said means provided on the plate advantageously comprise a groove into which the second end of the pin is knocked over by plastic deformation.

The housing for the pin in the rod is advantageously L-shaped and has a radial passage accommodating the first end of the pin and a longitudinal slot connecting the radial passage to one end of the rod. The pin can therefore be fitted easily by translational movement into the rod, which is itself fitted by a translational movement in the through-passage in the locking piece and in the orifices of the aforementioned plates.

The device is therefore simple and easy to fit and to remove.

Other advantages and features of the invention will become apparent from reading the following description given by way of nonlimiting example and with reference to the attached drawings in which:

FIG. 4 is a schematic view in axial section of the locking piece of the device according to the invention;

FIG. 5 is a schematic view in axial section of the rod of the device according to the invention;

FIG. 6 is a view in section on A-A of FIG. 5;

FIG. 7 is a schematic view of the pin used in the device according to the invention;

Figure 1:
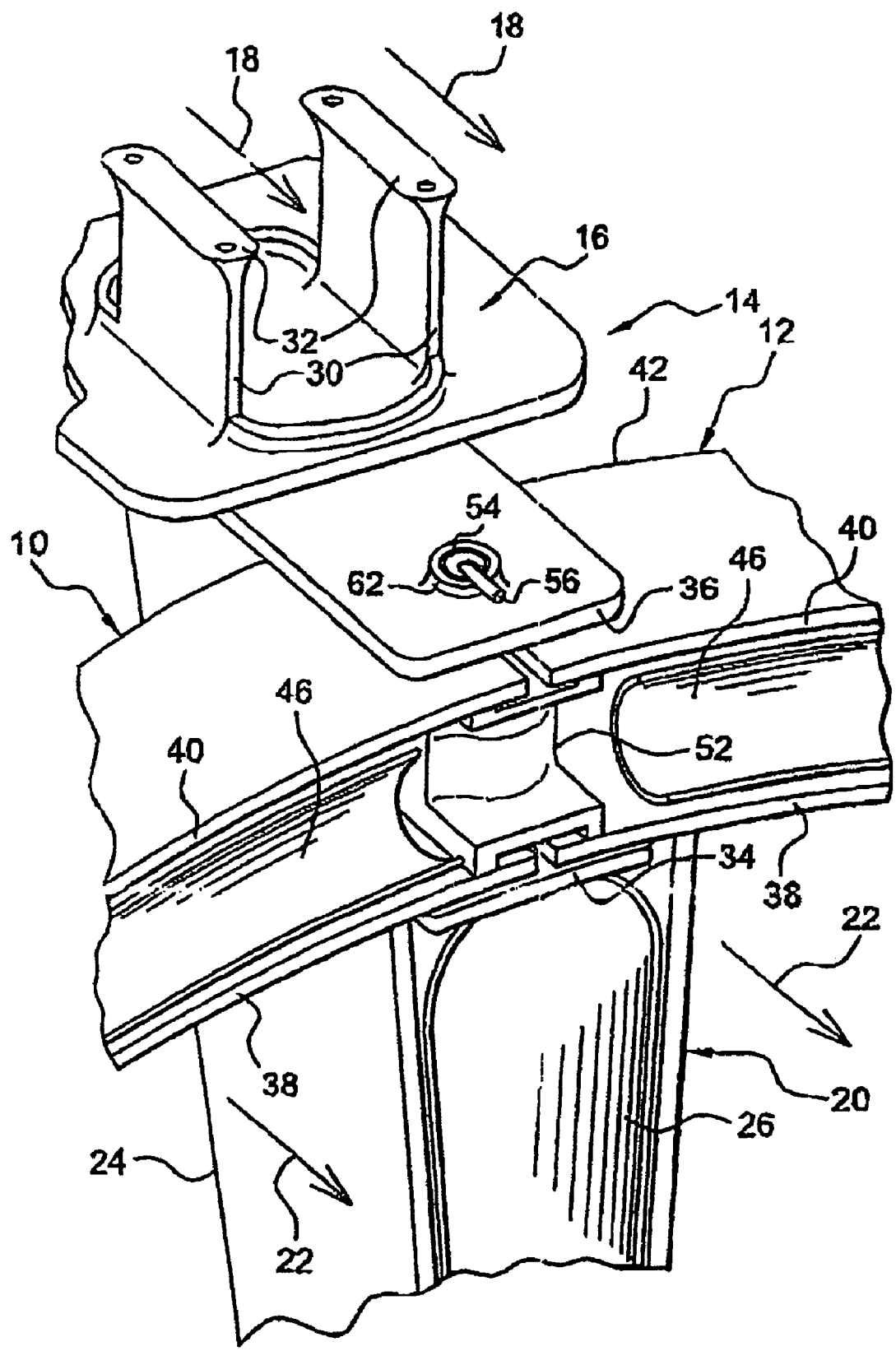
FIG. 1 is a partial perspective schematic view of the ends of two burner ring sectors and of a fixing device according to the invention.
Figures 2, 3:
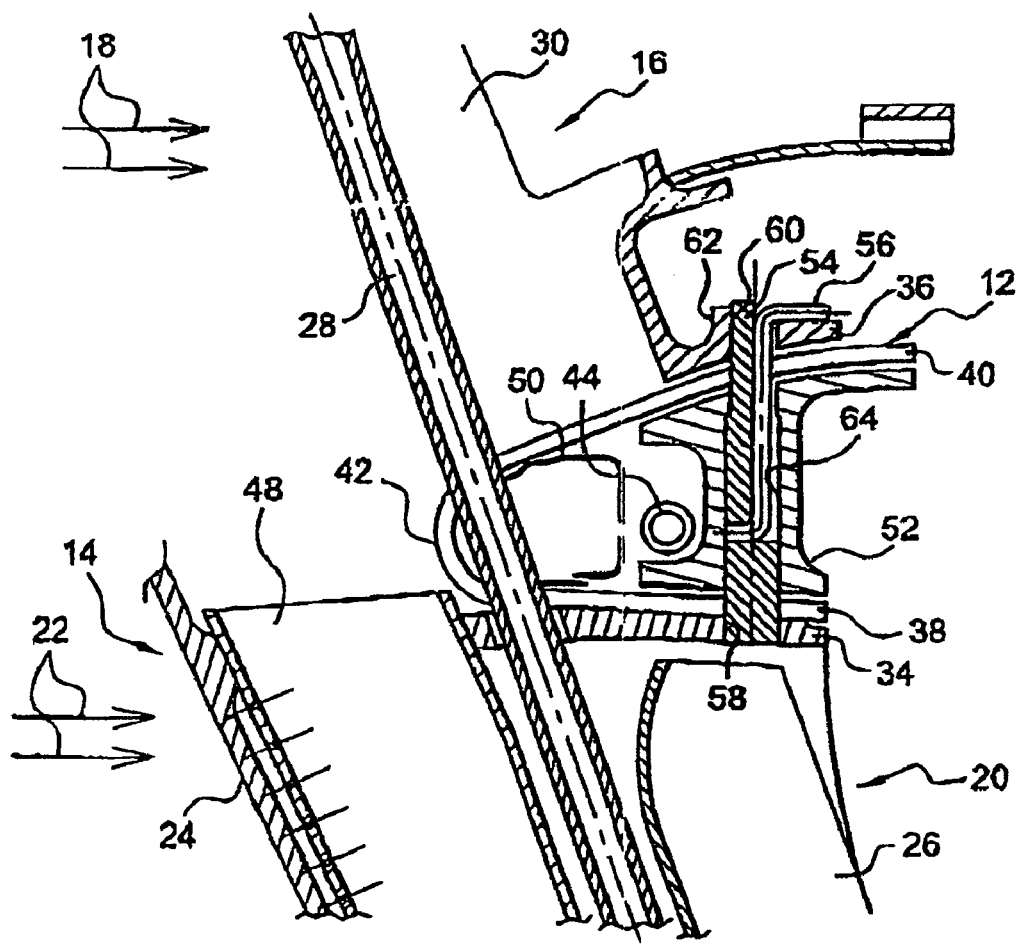
FIG. 2 is a partial schematic view in axial section of a flameholder arm comprising the device according to the invention for fixing the ring sectors.
FIG. 3 is a schematic perspective view of the locking piece of the device according to the invention.

Reference is made first of all to FIGS. 1 and 2 which are partial views of a burner ring formed of sectors 10, 12 carried by flameholder arms 14 of an afterburner combustion chamber of a bypass turbojet engine.

The flameholder arms 14 extend radially around the axis of the turbojet engine and comprise a radially outer part 16 extending into the bypass stream of the turbojet engine, depicted schematically by the arrows 18, and a radially inner part 20 extending into the main stream of the turbojet engine, schematically depicted by the arrows 22. The arms 14 are uniformly spaced apart and there are, for example, nine of them in the afterburner combustion chamber.

The radially inner part 20 of each arm 14 is formed of a hollow dihedron, the edge 24 of which is directed towards the upstream end of the turbojet engine and which is closed on the downstream side by a curved wall 26 forming a screen to afford thermal protection to a fuel supply line 28 which extends radially into the arm 14 from an external casing of the afterburner combustion chamber and which comprises fuel spray holes directed, for example, downstream.

The radially outer part of the edge 24 of the dihedron of the arm 14 is generally cut to form an opening to capture some of the bypass stream 18 and the two side walls 30 of this part of the dihedron are fixed to the aforementioned outer casing by flat lugs 32 perpendicular to these walls, exhibiting orifices for the passage of fixing means of the screw-nut or similar type.

Each flameholder arm 14 has, near its radially outer end, two parallel plates 34, 36, these being respectively a radially inner plate and a radially outer plate, which are circumferentially directed and serve to support and guide the ends of the ring sectors 10, 12. These plates 34, 36 are of approximately rectangular shape and extend, in an axial direction, downstream from the arm 14.

The burner ring sectors 10, 12 have the overall shape of dihedron with a rounded vertex and extend circumferentially around the axis of the afterburner combustion chamber.

Each sector has two flanges 38, 40, a radially inner one and a radially outer one, joined together on the upstream side by a rounded vertex 42, the inner flange 38 being of more or less cylindrical shape and centered on the axis of the afterburner combustion chamber while the outer flange 40 is slightly curved in axial section and extends obliquely outward from the upstream to the downstream direction.

The plates 34, 36 of the arm 14 are more or less parallel to the flanges 38, 40 of the burner ring sectors 10, 12 in the view in axial section of FIG. 2, and in the close vicinity of these flanges 38, 40.

An annular line 44 for supplying fuel extends into each burner ring sector and is radially connected to the outer casing of the afterburner combustion chamber. It has fuel spraying holes directed downstream and is protected thermally on the downstream side by a curved wall 46 housed between the downstream ends of the flanges 38, 40 of each burner ring sector 10, 12.

A ventilation casing 48 is housed in each arm 14 between the edge 24 thereof and the fuel supply line 28 which passes between the ends of the burner ring sectors and through an orifice in the inner plate 34 of the arm 14. A ventilation casing 50 is arranged in each burner ring sector and extends along the line 44 between the latter and the rounded vertex 42 of the sector. The ventilation casings 48, 50 are supplied with air by the proportion of the bypass stream 18 which is captured by the radially outer part 16 of each arm 14.

In operation, the temperature of the bypass airstream 18 is of the order of 200° C. for example, and that of the primary stream 22 may vary between 800 and 1800° C. depending on the turbojet engine operating speed. The circulation of the bypass airstream through the arms 14 and the burner ring cools the lines 28, 44, the arms 14 and the ring sectors 10, 12 and improves the spraying of fuel into the primary stream 22.

When the ring sectors 10, 12 are mounted, the ends of these sectors are engaged between the parallel plates 34, 36 of the arms 14 and are held there by fixing devices according to the invention, each of which comprises a locking piece 52 engaged both between the parallel plates 34, 36 of the arm 14 and between the ends of two ring sectors 10, 12. The locking piece 52 is held axially and circumferentially by immobilizing means comprising a rod 54 and a pin 56 which are inserted through aligned radial orifices in the plates 34, 36 of the arm 14 and the locking piece 52.

More precisely, the plates 34, 36 of the arm 14 comprise aligned orifices 58, 60 in which the ends of the immobilizing means 54, 56 are housed. The orifice 60 in the radially outer plate 36 is made in a radially outer boss 62 which exhibits an axial groove, the function of which will be described hereinbelow.

The facing circumferential ends of the flanges 38, 40 of the ring sectors 10, 12 are slightly separated from one another to allow the immobilizing means 54, 56 to pass between them.

The locking piece 52 of the device according to the invention, best visible in FIGS. 3 and 4, comprises a roughly cylindrical through passage 64 directed radially with respect to the axis of the turbojet engine and intended to accommodate the aforementioned immobilizing means 54, 56.

The locking piece 52 is made as one piece and of rounded overall shape, that is to say is free of spikes, sharp edges and protrusions which might serve to catch the flames. This piece 52 constitutes a kind of packing piece or wedge and has two opposite faces 66, 68, the radially inner and radially outer faces respectively, two side faces 70, 72, an upstream face 74 and a downstream face 76.

The radially outer face 68 of the locking piece 52 has a shape and curvature corresponding to those of the radially outer flange 40 of the ring sectors 10, 12 and the radially inner face 66 has a flat shape corresponding to that of the radially inner flange 38 of the ring sectors 10, 12.

These faces 66, 68 each comprise an axial groove 78, 80 of shallow depth delimiting, in the faces 66, 68, two strips for resting against the facing ends of the ring sectors 10, 12. The grooves 78, 80 ventilate the ring fixing device and limit the relative rubbing surfaces of the ring sectors 10, 12 and the locking piece 52. The through-passage 64 passing through the piece 52 opens more or less into the middle of the grooves 78, 80 in the aforementioned faces 66, 68.

The upstream face 74 of the locking piece 52 forms a channel housing the annular line 44 of the burner ring sector, as is depicted in FIG. 2, and the downstream face 76 has a rounded shape more or less in the continuation of the aforementioned curved walls 46 forming a screen affording thermal protection to the line 44.

The side faces 70, 72 face the ends of the aforementioned curved walls 46, as depicted in FIG. 1.

In the embodiment of FIG. 4, the through-passage 64 comprises two coaxial cylindrical parts 82, 84 of different diameters, connected by a frustoconical counterbore 86.

The larger-diameter cylindrical part 82 extends from the inner face 66 over most of the height of the locking piece 52 as far as the counterbore 86, and the smaller-diameter cylindrical part 84 extends from the counterbore 86 as far as the outer face 68 of the locking piece 52.

The rod 54 intended to be mounted in the through-passage 64 in the locking piece 52 is depicted in FIGS. 5 and 6 and has a shape that complements that of the through-passage 64 of the locking piece 52. It comprises two coaxial cylindrical parts 88, 90 of different diameters which are connected by a frustoconical shoulder 92.

The larger-diameter cylindrical part 88 extends from the radially inner end of the rod 54 as far as the shoulder 92, its diameter is slightly smaller than the inside diameter of the larger-diameter part 82 of the passage 64 and its length exceeds that of this part 82 so that its radially inner end can be housed in the orifice 58 in the inner plate 34 of the arm 14, as depicted in FIG. 2.

The smaller-diameter cylindrical part 90 extends in line with the larger-diameter part 88 from the shoulder 92 as far as the outer end of the rod 54. Its diameter is slightly smaller than the inside diameter of the smaller-diameter part 84 of the passage 64 and its length exceeds that of this part 84 so that its radially outer end can be housed in the orifice 60 in the outer plate 36 of the arm 14, as depicted in FIG. 2.

The rod 54 is mounted with clearance in the orifices 58, 60 in the plates 34, 36 of the arm 14 and in the through-passage 64 in the locking piece 52.

The rod 54 further comprises a housing for accommodating the pin 56 of the immobilizing means. This housing is L-shaped and includes a passage 94 that is radial with respect to the axis of the rod 54 and formed more or less in the middle of the larger-diameter cylindrical part 88, and a longitudinal slot 96 connecting the radial passage 94 to the radially outer end of the rod 54.

The pin 56 depicted in FIG. 7 is a small-diameter rectilinear cylindrical pin with one end 98 bent over at right angles. It is, for example, made of metal.

The pin 56 is intended to be engaged in the L-shaped housing of the rod 54, the bent-over end 98 being housed in the radial passage 94 of the rod 54 and the remainder of the pin 56 extending into the longitudinal slot 96 of the rod 54. The pin 56 has a diameter slightly smaller than the width of the slot 96 of the rod 54 and is mounted with clearance therein. The pin 56 has a length greater than that of the slot 96 so that its free end protrudes axially beyond the radially outer end of the rod 54.

As mentioned hereinabove, the rod 54 bearing the pin 56 is engaged in the orifices 58, 60 in the plates 34, 36 of the arm 14 and in the through-passage 64 in the locking piece 52 until the shoulder 92 of the rod 54 comes to rest against the counterbore 86 of the passage 64, the free ends of the rod 54 lying flush with the surfaces of the plates 34, 36 which are situated on the opposite side to the locking piece 52.

To complete the fixing of the burner ring sectors 10, 12 to the flameholder arm 14, the free end of the pin 56 which protrudes beyond the radially outer end of the rod 54 and the outer plate 36 of the arm 14 is bent over at about 90° by plastic deformation until it lies in the aforementioned groove of the boss 62 of the orifice 60 of the outer plate 36, as depicted in FIGS. 1 and 2, in order to immobilize the rod 54 axially and in terms of rotation in the through-passage 64 of the locking piece 52.

In the alternative form of embodiment of FIGS. 8 and 9, the pin 56 used is identical to the one described hereinabove, the locking piece 100 depicted in FIG. 8 and the rod 102 depicted in FIG. 9 differing slightly from those of the first form of embodiment of the device according to the invention.

Figure 8:
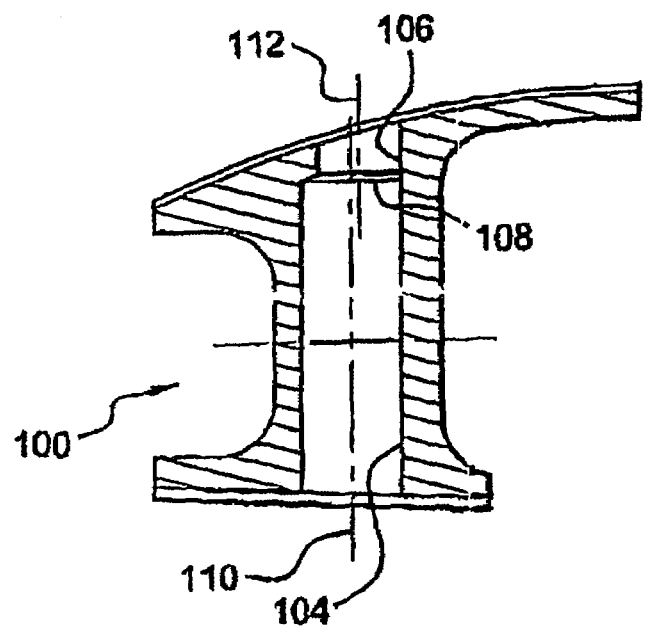
FIG. 8 is a schematic view in axial section of the locking piece according to an alternative form of embodiment of the device according to the invention.
Figure 9:
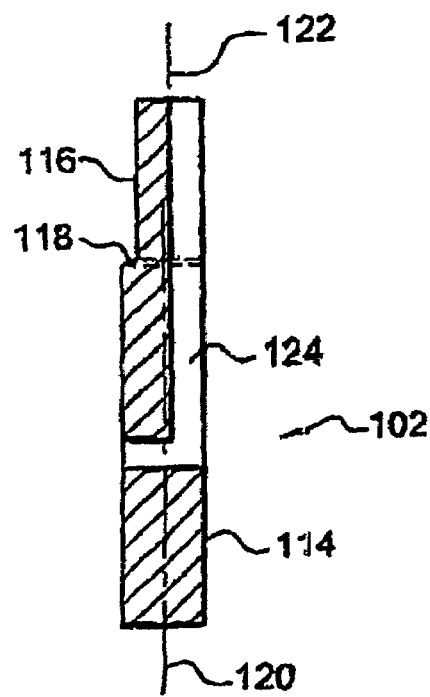
FIG. 9 is a schematic view in axial section of the rod in this alternative form of embodiment of the device according to the invention.

In FIG. 8, the through-passage in the piece 100 comprises two off-centered cylindrical parts 104, 106 of different diameters, connected by a surface 108 which is frustoconical on one side and cylindrical on the other.

The cylindrical part 104, of axis 110, which has a larger diameter, extends from the radially inner face of the piece 100 over most of the height of this piece as far as the surface 108, and the cylindrical part 106 of axis 112 having a smaller diameter is off-centered with respect to the axis 110 and extends from the surface 108 as far as the radially outer face of the locking piece 100.

The rod 102 has a shape that complements that of the through-passage in the locking piece 100 and comprises two non-concentric cylindrical parts 114, 116 of different diameters which are connected by a semi-frustoconical shoulder 118.

The cylindrical part 114, of axis 120, which has a large diameter, extends over most of the rod 102 as far as the shoulder 118, and the cylindrical part 116 of axis 122 which has a smaller diameter is off-centered with respect to the axis 120 and extends outwards from the shoulder 118.

The pin 56, depicted in FIG. 7, is inserted in the same way as was described hereinabove, into an L-shaped housing 124 formed in the rod 102, the rod 102 then being introduced, from inside the arm 14, into the orifices 58, 60 in the plates 34, 36 of the arm 14 and into the through-passage in the locking piece 100.

As in the first embodiment of the device according to the invention, the locking piece 100 is held axially in the downstream direction by the rod 102 engaged in the aforementioned orifices 58, 60 in the plates 34, 36 of the arm 14, the rod 102 rests via its shoulder 118 on the surface 108 of the through-passage in the piece 100 and the bending-over of the end of the pin 56 at about 90° allows the rod 102 to be immobilized axially in the through-passage of the piece 100. Rotational movement of the rod 102 in the passage in the locking piece 100 is automatically prevented by the eccentricity of the cylindrical parts 114, 116 of the rod 102 and of the cylindrical parts 104, 106 of the through-passage in the piece 100.

The invention claimed is:

1. A device for fixing a burner ring onto flameholder arms in a turbojet engine afterburner combustion chamber, the burner ring being formed of ring sectors placed more or less end to end, wherein facing ends of consecutive ring sectors are housed and guided between two circumferentially-directed roughly parallel plates of the flameholder arms and are immobilized between said plates by locking pieces engaged between said plates and between the facing ends of the ring sectors, said locking pieces being held between said plates by an immobilizing device engaged in aligned orifices in said plates and in said locking pieces.

2. The device as claimed in claim 1, wherein each locking piece is made in one piece and of rounded overall shape.

3. The device as claimed in claim 1 or 2, wherein each locking piece comprises two opposed faces, a radially inner face and a radially outer face respectively, which are engaged between flanges of the ring sectors and which are of a shape and curvature that correspond to those of the flanges of the ring sectors.

4. The device as claimed in claim 1, wherein each locking piece comprises a through passage directed radially respectively with respect to the axis of the afterburner combustion chamber and housing a cylindrical rod having ends engaged in said orifices in the plates of the flameholder arm.

5. The device as claimed in claim 4, wherein the ends of the rod lie flush with the surfaces of said plates which are situated on the opposite side to the locking piece.

6. The device as claimed in claim 4, further comprising a mechanism configured to prevent translational movement of the rod in the through passage of the locking piece, said mechanism comprising a shoulder formed on the cylindrical surface of the rod and resting against the shoulder on the internal surface of the passage in the locking piece.

7. The device as claimed in claim 6, wherein the shoulders of the rod and of the passage in the locking piece are off-centered or dissymmetric with respect to the axis of the rod and of the passage and form means for immobilizing the rod in terms of rotation in the passage.

8. The device as claimed in claim 4, wherein the rod comprises a housing to accommodate a pin, a first end of which is immobilized in terms of rotation and in terms of translation in said housing and the second end of which extends into said orifice in one of the plates of the flameholder arm and is held by a holding device provided on this plate.

9. The device as claimed in claim 8, wherein said holding device provided on the plate comprises a groove into which the second end of the pin is knocked over by plastic deformation.

10. The device as claimed in claim 9, wherein the groove accommodating the knocked-over end of the pin is formed in the radially outer plate of the flameholder arm.

11. The device as claimed in claim 8, wherein the housing for the pin in the rod is L-shaped and has a radial passage accommodating the first end of the pin and a longitudinal slot connecting the radial passage to one end of the rod.

12. The device as claimed in claim 11, wherein the longitudinal slot opens onto the end of the rod which is engaged in the orifice in the radially outer plate of the flameholder arm.

13. The device as claimed in claim 8, wherein on assembly, the locking piece is engaged between the plates of the flameholder arm and between the ends of the ring sectors, the pin is placed in the housing of the rod, the rod bearing the pin is engaged in the through-passage in the locking piece and in the orifices in the plates, from inside the flameholder arm and radially from the inside outwards, after which the outer end of the pin is knocked over onto the radially outer plate of the flameholder arm.

14. The device as claimed in claim 4, wherein the rod is mounted with clearance in the through-passage in the locking piece and in the orifices in said plates.

\* \* \* \* \*